United States Patent Office 3,008,983
Patented Nov. 14, 1961

3,008,983
PREPARATION OF METHYLAROMATIC DICARBOXYLIC ACIDS
Alan E. Ardis, Hamden, Herman A. Bruson, North Haven, and Alexander A. Vaitekunas, New Haven, Conn., assignors to Olin Mathieson Chemical Corporation, New Haven, Conn., a corporation of Virginia
No Drawing. Filed Oct. 7, 1957, Ser. No. 688,419
5 Claims. (Cl. 260—524)

This invention relates to the preparation of certain methylaromatic dicarboxylic acids and particularly to the preparation of useful isomeric mixtures of methylphenyl dicarboxylic acids. More specifically, this invention is directed to a process for the preparation of isomeric monomethylphenyl dicarboxylic acids and of isomeric dimethylphenyl dicarboxylic acids by the catalytic oxidation in liquid phase of trimethyl benzene and of tetramethyl benzene characterized by at least one pair of adjacent (ortho) methyl groups.

The objects of the invention include mainly the preparation of methylaromatic dicarboxylic acids, particularly isomeric mixtures of such acids, by a novel oxidation procedure; the provision of a process for the catalytic oxidation in liquid phase of a tri- or tetra-methylbenzene and related compounds, containing at least one pair of adjacent methyl nuclear substituents, so as to result in the formation of monomethylphenyl or dimethylphenyl dicarboxylic acid; and especially, the provision of a catalytic liquid phase oxidation process such that a tri- methyl or higher poly-methyl benzene is oxidized to a dicarboxylic acid wherein only one of each pair of ortho methyl groups has been converted to a carboxyl group.

The process of this invention is particularly advantageous for the conversion of pseudocumene (1,2,4-trimethylbenzene) to an isomeric mixture of monomethylphenyl dicarboxylic acids, methylterephthalic acid (1,4-dicarboxy-3-methylbenzene) and 4-methylisophthalic acid (1,3-dicarboxy-4-methyl benzene):

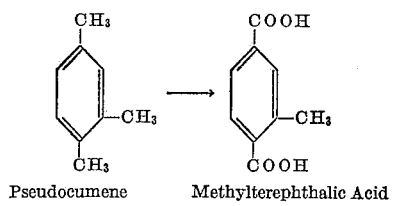

Pseudocumene     Methylterephthalic Acid and

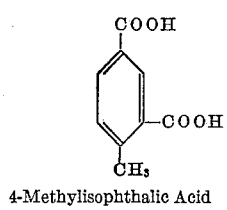

4-Methylisophthalic Acid

Likewise, durene (1,2,4,5-tetramethylbenzene) is converted to an isomeric mixture of dimethylphenyl dicarboxylic acids:

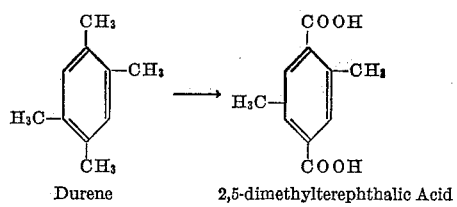

Durene     2,5-dimethylterephthalic Acid and

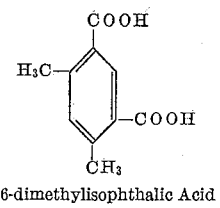

4,6-dimethylisophthalic Acid

The above isomeric mixtures of methylphenyl dicarboxylic acids are especially adapted for the preparation of excellent alkyd resins because of their good solubility in hot glycols or glycerol, in contrast to the relative insolubility of terephthalic acid and difficulty of processing it into alkyd resins. However, such uses impose the requirement that the product be substantially free of monocarboxylic acid and particularly of tricarboxylic acid. Therefore, the process of this invention is especially valuable in its provision in a single oxidation step of a polybasic aromatic acid product which is substantially free of other than dibasic acid.

Such advantageous results have been found to be obtainable by carrying out the oxidation in accordance with the following conditions.

The starting material, a trimethyl or higher polymethyl benzene having at least one pair of ortho methyl groups, or a mixture of such compounds, is provided in the form of a dilute solution in a lower fatty acid, or mixture thereof, containing 2 to 4 carbon atoms, containing 5 to 50, preferably 10 to 20 parts by weight of fatty acid per part by weight of oxidizable hydrocarbon, in the presence or absence of minor proportions of inert diluents such as benzene or chlorobenzene.

The solution also contains an effective oxidation catalyst comprising a dissolved cobalt salt of a fatty acid of acetic, propionic, or butyric acid, in such amount as to correspond to 0.1 to 1%, preferably 0.3 to 0.6%, based on the weight of the fatty acid solvent.

It is further essential to provide as reaction activator a methylenic ketone such as methyl ethyl ketone, which is preferred diethylketone, methylpropyl ketone, 2,4-pentanedione, or 2,5-hexanedione, at a concentration range of at least about 1% and preferably in the range of 3 to 10% by weight of the fatty acid solvent. Higher concentrations may be advantageous at times, particularly in view of the fact that the activator is readily recovered for re-use from the reaction mixture.

In has further been found that best results with respect to speed and selectivity of the oxidation reaction are secured by the provision of between about 1% and 9%; preferably 3 to 7%, of water by weight of the reaction mixture.

The desired oxidation is effected by contacting the reaction mixture at a temperature between about 100° C. and 150° C., preferably at about 130° C., with a gas containing molecular oxygen at a partial pressure of oxygen between 100 and 1,000 pounds per square inch, preferably about 400 to 700 pounds per square inch. The oxygen containing gas may be air, or air enriched with oxygen, or preferably, oxygen of commercial purity.

The time of reaction may vary from a few minutes to several hours depending on the temperature, pressure and concentrations being used, being shorter the higher the temperature and pressure. Reaction conditions can readily be chosen so that the oxidation is terminated before any appreciable amount of tricarboxylic acid is formed, based on the finding that, under the novel conditions of this invention, only one of each pair of ortho methyl groups is readily oxidizable. In other words, under a given set of conditions within the above-outlined limits, the oxidation of two methyl groups which are ortho to each other requires many times the period of time needed for the oxidation of only one of them.

The following specific examples provide illustrative embodiments in accordance with this invention.

Example 1

A mixture of 314 parts by weight of glacial acetic acid, 10.8 parts of methyl ethyl ketone, 36 parts of pseudocumene, and 7.5 parts of cobalt acetate tetrahydrate was charged into a stainless steel pressure reactor provide with temperature control, efficient stirrer and with a suitable inlet for the introduction of gas. Stirring was started, oxygen gas was introduced up to a pressure of 300 pounds per square inch gauge and heating begun. As soon as the reaction mixture reached 130° C., the oxygen pressure was increased to 500 p.s.i.g. and the oxidation continued for one hour, while maintaining the temperature at 130° C. by means of a cooling coil heat exchanger.

The reaction mixture was cooled to room temperature, and white, crystalline solid was separated by filtration, washed with cold water and dried. This product amounted to 26 parts by weight and consisted of close to 65% by weight 2-methyl terephthalic acid and 35% by weight 4-methyl isophthalic acid as shown by ultra-violet and infra-red spectroscopic measurements.

The product displayed a melting range of about 300° to 330° C. (with sublimation) and a neutral equivalent in duplicate determination of 89.4 and 89.6 (calculated for $CH_3(C_6H_3)(COOH)_2 = 90.0$).

The above analyses, including the studies by infra-red spectroscopy and knowledge of the solubility of the monobasic acids in the reaction mixture, indicate the substantial absence of tribasic acid and that the product is a substantially uncontaminated mixture of the above dicarboxylic acids.

The filtrate from the above product can be subjected to distillation to remove the water and then recycled in the process by introducing additional pseudocumene, methyl ethyl ketone and a small amount of water in the aforementioned quantities.

Example 2

In the above example, a substantial quantity of the methyl ethyl ketone activator is consumed during the reaction. If a somewhat higher concentration of methyl ethyl ketone is used, the oxidation is 80% or more complete in from seven to seventeen minutes. A study of the reaction kinetics has shown that under these conditions only 10 to 20% of the methyl ethyl ketone is consumed and thus, for economical operation, it is advantageous to use a method as described below:

314 parts of glacial acetic acid, 25.2 parts of pseudocumene, 21.6 parts of methyl ethyl ketone and 7.5 parts of cobalt acetate tetrahydrate were charged into a stainless steel pressure vessel equipped with a cooling coil and agitator. Oxygen was introduced up to 300 p.s.i.g. and the contents stirred and heated. When the temperature reached 130° C., the oxygen pressure was increased to 500 p.s.i.g. and the temperature maintained for 10 to 20 minutes at 130° C. The contents were then quickly cooled to room temperature, the oxygen pressure released and the mixture was subjected to fractional distillation. There were recovered 15.7 parts of methyl ethyl ketone or 73% of that originally present. Water was also removed by distillation. On cooling of the distillation residue and filtration, washing with cold water and drying, there were obtained 20.5 parts of mixed methyl terephthalic and 4-methyl isophthalic acids. The filtrate containing the catalyst and dimethyl benzoic acids was mixed with additional pseudocumene and methyl ethyl ketone in the aforementioned quantities and a small amount of water corresponding to 3% by weight of the reaction mixture was added. The mixture was again oxidized as described above, for 10 to 17 minutes; this operation being repeated in a cyclic manner.

Thus, the yield of mixed methyl terephthalic and 4-methyl isophthalic acids obtained in this manner after eight cycles, using 151.2 parts by weight of pseudocumene amounted to 173 parts by weight (81% of theoretical). The product yielded analytical values similar to those of Example 1. Also, about 75% by weight of the methyl ethyl ketone added was recovered.

Examples 3–6

The following examples illustrate the variation in the extent of conversion to the desired dicarboxylic acid product resulting from the indicated changes in composition of the reaction mixture. The procedure was in accordance with Example 1 except as indicated.

| Example | Pseudocumene, parts by weight | Methyl ethyl ketone, parts by weight | Time at 130° C. minutes | Yield dibasic acid product, percent of theoretical |
|---|---|---|---|---|
| 3 | 36 | 21.6 | 11.5 | 45 |
| 4 | 36 | 21.6 | 19.5 | 63 |
| 5 | 25.2 | 10.8 | 60 | 61 |
| 6 | 18.0 | 21.6 | 8 | 80 |

In each case, the product was characterized by excellent properties and displayed analytical values similar to those of the Example 1 product.

Example 7

A mixture of 314 parts by weight of glacial acetic acid, 30.5 parts of durene (commercial grade—95% purity), 10.8 parts of methyl ethyl ketone, and 7.5 parts of cobalt acetate tetrahydrate was charged into a stainless steel pressure reactor equipped with a temperature controller, stirrer and suitable inlet for the introduction of gas. The stirrer and heating were started and oxygen was introduced up to 300 p.s.i.g. As soon as the temperature reached 130° C. the oxygen pressure was increased up to 500 p.s.i.g. After 10 minutes the reaction became very exothermic and efficient cooling had to be applied. The oxidation was continued at 130°±3° C. for one hour while maintaining vigorous stirring. Then the reaction mixture was cooled to room temperature and the precipitated acids were filtered, washed with cold water and dried. The dried product amounted to 23.5 parts by weight. Solvent was removed from the filtrate by distillation and the residual solution was diluted with about an equal volume of water. The precipitated mono- and dibasic acids were separated by filtration, washed with water and dried. They were then converted to methyl esters and the methyl esters of the monobasic acids were removed by distillation. Subsequently, the dibasic acid esters were converted to the dibasic acids by saponification and neutralization with acid, resulting in the recovery of 10.0 parts by weight of the mixed dimethyl phthalic acids. Thus, the total amount of acid product was 33.5 parts (N. E. 99.0, theoretical being 97.0), 80% of the theoretical yield.

Analytical studies of the product by ultra-violet and infra-red spectroscopic measurements indicated that it consisted of about 33% of 2,5-dimethyl terephthalic and 67% of 2,4-dimethylisophthalic acid.

As in the previous examples, the reaction mixture, after being restored to the starting composition, can be re-cycled with obtainment of similar results. In this way, the amount of reagents consumed is minimized and better yields of dibasic acid from the starting hydrocarbon are obtained as any monobasic acid formed in the reaction mixture remains dissolved and is subsequently oxidized to the dibasic acid.

Accordingly, this invention provides advantageous process conditions whereby polymethyl aromatic compounds containing at least three methyl groups with at least two methyl groups ortho to each other may be selectively oxidized in an efficient manner to result in isomeric mixtures of aromatic dibasic acids having various industrial uses. The product is particularly suited for incorporation in alkyd resins and for the preparation of excellent plasticizers by esterification with monohydric alcohols such as butanol, 2-ethylhexanol, and higher alcohols or with polyhydric alcohols such as glycols, glycerol and pentaerythritol. An important feature of the products resulting from the process of this invention is the substantial absence of monobasic acid or of tribasic or higher acids. This result is based on the selectivity provided in the novel reaction conditions, as any monobasic acid formed in the reaction mixture remains dissolved in the fatty acid solvent and can be further oxidized in subsequent cycles. Furthermore, the reaction conditions are such that substantially no tribasic or higher acid forms when the reaction period of a few minutes to several hours is adjusted in the preferred manner to result in the conversion of about 30% to 90% of the starting material to the desired dibasic acid.

We claim:

1. Process for preparing methylaromatic dicarboxylic acids comprising providing a dilute solution of a polymethylbenzene containing at least three methyl substituents, of which at least two are ortho to each other, in a lower fatty acid having 2 to 4 carbon atoms, said solution containing 5 to 50 parts by weight of said fatty acid per part by weight of said polymethylbenzene,, 1% to about 9% of water, based on the weight of the reaction mixture, about 3% to 10% of a methylenic ketone, based on the weight of said fatty acid, and 0.1% to about 1%, based on the weight of said fatty acid, of a cobalt salt of a lower fatty acid containing 2 to 4 carbon atoms, and contacting the said solution with an oxygen-containing gas at a partial pressure of oxygen of about 100 to 1,000 pounds per square inch at a temperature of about 100° C. to 150° C., and continuing the reaction for a period of a few minutes to several hours to convert at least about 30% and not more than about 90% of the starting material to dibasic acid.

2. Process in accordance with claim 1, wherein the polymethylbenzene is pseudocumene.

3. Process in accordance with claim 1, wherein the polymethylbenzene is durene.

4. Process for preparing methylbenzene dicarboxylic acids comprising providing a dilute solution of a polymethyl-benzene compound containing at least three methyl substituents, of which at least two are ortho to each other, in a lower fatty acid having 2 to 4 carbon atoms, said solution containing 5 to 50 parts by weight of said fatty acid per part by weight of said polymethyl-benzene, 3% to about 7% of water, based on the weight of the reaction mixture, about 3% to 10% of a methylenic ketone, based on the weight of said fatty acid, and 0.1% to about 1%, based on the weight of said fatty acid, of a cobalt salt of a lower fatty acid containing 2 to 4 carbon atoms, and contacting the said solution with an oxygen-containing gas at a partial pressure of oxygen of about 400 to 700 pounds per square inch at a temperature of about 100° C. to 150° C., and continuing the reaction for a period of a few minutes to several hours to convert at least about 30% and not more than about 90% of the starting material to dibasic acid.

5. Process in accordance with claim 4, wherein the reaction temperature is about 130° C.

References Cited in the file of this patent
UNITED STATES PATENTS

| | | |
|---|---|---|
| 2,245,528 | Loder | June 10, 1941 |
| 2,509,855 | Beach | May 30, 1950 |
| 2,673,217 | Hull | Mar. 23, 1954 |

OTHER REFERENCES

Rodd Chemistry of Carbon Compounds, vol. III B, pp. 858 and 861 (1956).